July 31, 1962 H. E. PRAVEL 3,046,801
ROTARY TO LINEAL MOTION CONVERTER
Filed July 31, 1961
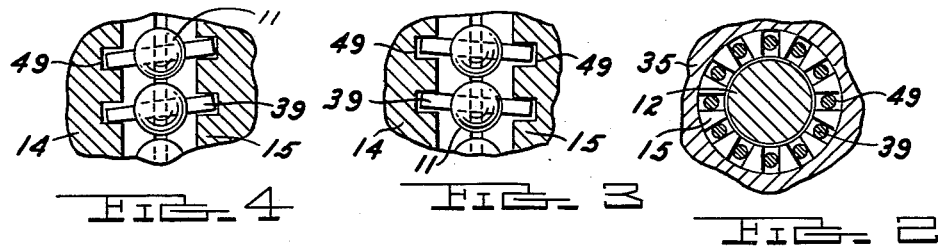
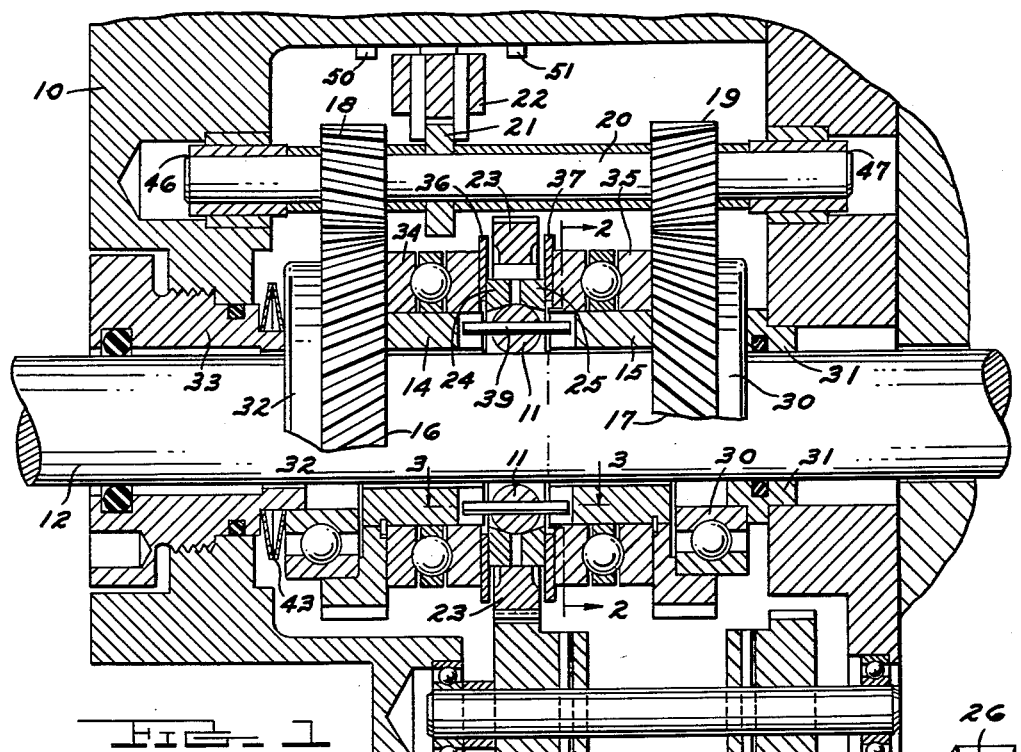
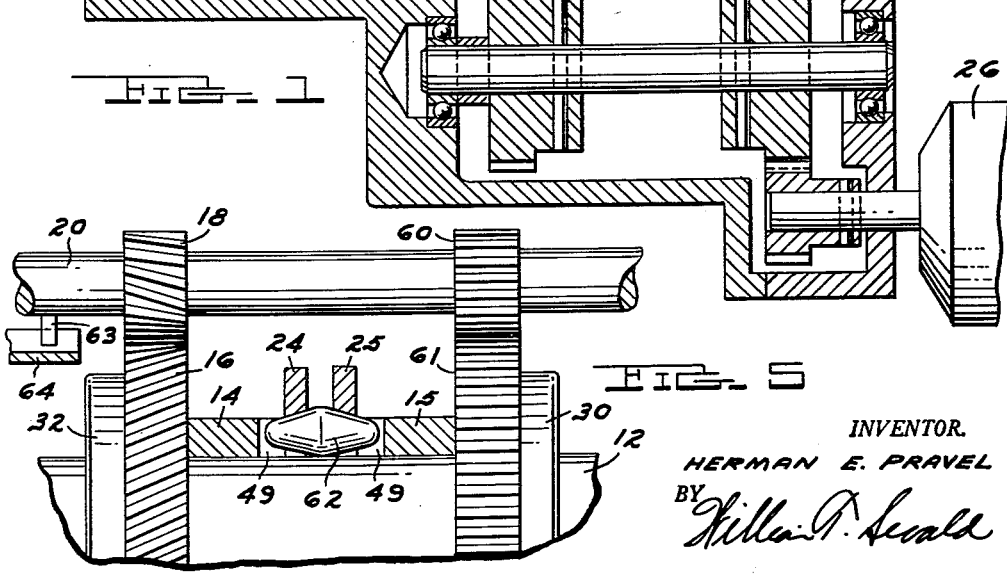
INVENTOR.
HERMAN E. PRAVEL
BY
ATTORNEY

United States Patent Office 3,046,801
Patented July 31, 1962

3,046,801
ROTARY TO LINEAL MOTION CONVERTER
Herman E. Pravel, 1275 Robson Lane, Bloomfield
Township, Birmingham, Mich.
Filed July 31, 1961, Ser. No. 128,094
6 Claims. (Cl. 74—25)

This invention relates to a rotary to lineal motion converter having a mechanically moved thrust shaft and means for selectively varying the force, direction, and amplitude of shaft movement. This application is a continuation in part of my co-pending application Serial No. 108,457 filed May 8, 1961.

Bi-directionally moved shafts have been employed heretofore such as in hydraulic and pneumatic cylinders for the purpose of moving the shaft to effect desired action in other devices, however, the several devices of the prior art have not proven entirely satisfactory inasmuch as they are complicated in design and construction, expensive to manufacture, difficult to use, difficult to maintain in satisfactory use condition, are limited to shaft projection, and are cumbersome in that they require much additional equipment such as fluids, tanks, pumps, pressure chambers, reservoirs, seals, and lines.

With the foregoing in view, the primary object of the invention is to provide a device having a mechanically actuated shaft which is selectively movable in opposite directions at variable rates and forces of movement and which is simple in design and construction, inexpensive to manufacture, easy to use, easy to maintain in use condition, is unlimited in shaft projection, and which does not require any auxiliary cumbersome and expensive equipment.

An object of the invention is to provide a case having a rotationally secured axially movable thrust shaft wherein balls or rollers planetwise rotating about the thrust shaft in frictional engagement therewith are controlled in their applied helix angle relative to the thrust shaft to effect desired thrust shaft axial movement.

An object of the invention is to provide a diametrical pin in the balls having extending ends lying in planetary races traveling with the balls.

An object of the invention is to provide means for angularly moving at least one race relative to the other to bias the balls and pins helically relative to the thrust shaft to effect desired axial thrust on the thrust shaft.

An object of the invention is to provide cam rings surrounding the balls associated with means for adjustably forcing the cam rings relative to the balls to vary the frictional engagement force between the balls and the thrust shaft.

An object of the invention is to provide a ring gear on the cam rings for rotationally driving the cam rings and planetwise rotating the balls relative to the thrust shaft.

An object of the invention is to provide a helical gear on each race having opposed helix angles meshing with helical idler gears having mating teeth fixed on a common shaft so that by axially moving the idler gears relative to the race helical gears, one helical gear is moved angularly forwardly and the other rearwardly to control and change the applied helix angle of the balls relative to the thrust shaft.

An object of the invention is to utilize the traction between the rollers and the shaft to lock the shaft axially stationary when the helix angle of the line of contact is zero under rotational conditions and also lock when there is no relative movement between the parts regardless of helix angle to eliminate axial drifting or creeping of the thrust shaft.

An object of the invention is to provide means for selectably varying the angle of the ball individual axis from zero helix angle to an angle on either side of zero relative to the shaft axis to effect relative axial movement of the shaft in either axial direction in conjunction with unidirectional rotational ball movement.

These and other objects of the invention will become apparent by reference to the following description of a rotary to lineal motion converter having a mechanically actuated thrust shaft which is bi-directionally selectively operated as to amplitude, force, and direction of movement embodying the invention taken in connection with the accompanying drawing in which:

FIG. 1 is a longitudinal cross-sectional view of the novel device showing the helical gears partly in elevation.

FIG. 2 is a reduced cross-sectional view of FIG. 1 taken on the line 2—2 thereof showing the ball pin and race socket construction.

FIG. 3 is a fragmentary diagrammatic view of the balls and races taken on the line 3—3 of FIG. 1 showing a helix angle in one direction.

FIG. 4 is a view similar to FIG. 3 showing a helix angle in the opposite direction; and FIG. 5 is a fragmentary view of FIG. 1 showing gear and roller modifications.

Referring now to the drawing wherein like numerals refer to like and corresponding parts throughout the several views, the device disclosed therein to illustrate the invention comprises a case 10 housing planet balls 11 frictionally contacting thrust shaft 12 to move the shaft axially in either direction depending on the helix angle therebetween which is controlled by the races 14 and 15 angular relative position as set by helical gears 16 and 17 and mating helical idler gears 18 and 19 fixed on common control shaft 20 which is axially movable and positionable by the annular boss 21 and clevis 22 wherein axial movement of the control shaft 20 effects camming action between the idler gears 18 and 19 and helical gears 16 and 17 causing one helical gear 17 and race 15 to move in one angular direction and the other helical gear 16 and race 14 to move in the opposite angular direction as seen in FIGS. 3 and 4 to selectively vary the helix angle of the balls 11 relative to the shaft 12 as the balls orbit about the shaft as driven by the cam rings 24 and 25 keyed to the ring gear 23 which is driven by the motor 26 via the gear train.

More particularly, the race 15 is keyed to the gear 17 and both are supported by the bearing 30 and bushing 31 on one end of the case 10 while the race 14 is keyed to the gear 16 and both are supported by the bearing 32 and hub 33 on the other end of the case 10. The races 14 and 15 respectively carry the opposed bearing assemblies 34 and 35 which abut the cam rings 24 and 25 via spacers 36 and 37 respectively and it is to be noted that a Belleville washer spring 43 is disposed between the hub 33 and the bearing 32 adjacent thereto so that by screwing the hub inwardly against the fixed opposed bushing 31 at the other end of the case 10, the axial thrust on the cam rings 24 and 25 is increased to develop increased radial thrust on the balls 11 to move them into more forceful frictional contact with the shaft 12.

The ring gear 23, cam rings 24 and 25, and spacers 36 and 37 rotate at ring gear speed while balls 11, pins 39, races 14 and 15, and the helical gears 16 and 17 rotate at orbital speed with the bearing assemblies 34 and 35 and bearings 30 and 32 providing support and means for separating the parts which rotate at different speeds. These bearing separations also provide means for angularly varying one race 14 or 15 relative to the other race to adjust, vary, and control the applied helix angle of the pins 39 and balls 11 relative to the thrust shaft 12.

It is to be noted that the helical idler gears 18 and 19 are keyed rotationally and axially fixed on the shaft 20 which is axially slidably journalled in the case 10 at 46 and 47 so that the helical idler gears 18 and 19 and control shaft 20 rotate as a unit and move axially as a unit.

The angulation of the helical gears 17 and 19 on one side are opposite and opposed to the gears 16 and 18 on the other side and these are so adjusted to the races 14 and 15 and ball pins 39 to dispose the balls on zero helix angle when the gears 17 and 19 and the gears 16 and 18 meshed on center as shown. The helical gears 16 and 17 constitute opposed rotary cams controlling the relative angular position between the races 14 and 15, which in turn, controls the helix angle of the pins 39 and balls 11 relative to the shaft 12. The races 14 and 15 have sockets 49 housing the ends of the pins 39.

Moving the clevis 22 to the right from the position shown, causes the helical idler gears 18 and 19 to move to the right from the position shown causing one helical gear 16 and 17 to angularly move in one direction and the other to angularly move in the opposite direction and this moves the race 14 angularly in the opposite direction to the race 15 with the race slots 44 and 45 moving angularly oppositely to angulate the pins 39 and balls 11 therebetween on the desired helix angle and direction relative to the shaft 12 and this condition is shown in FIG. 3 which moves the shaft 12 in one axial direction such as to the right in conjunction with ball rotation.

Conversely, moving the clevis 22 to the left from the position shown moves the helical idler gears to the left causing the helical gears 16 and 17 to move angularly opposite to one another in directions opposite to that just described with similar action in the races 14 and 15, slots 44 and 45, pins 39, and balls 11 on the desired opposite helix angle and thrust direction to that just described relative to the shaft 12 and this condition is shown in FIG. 4 which moves the shaft 12 in the opposite axial direction such as to the left in conjunction with ball rotation.

The radially inward camming pressure of the rings 24 and 25 on the balls 11 and thrust shaft 12 is adjustable via turning hub 33 against the Belleville spring washers 43 and the speed of the motor may also be variable which in conjunction with variable clevis 22 movement gives a wide range of helix angle amplitude, rotational speed, and forced engagement effecting shaft axial movement.

Moving the clevis 22 over against either stop 50 or 51 effects the maximum helix angle of the balls 11 as applied to the shaft 12; partial movement of the clevis applies less than the full available helix angle and the maximum helix angle is controlled by the helix angle of the teeth on the gears 16 to 19 as desired in building the unit. Movement of the clevis 22 may be effected manually or automatically by servo mechanisms as desired. Manual operation is used herein for simplicity of description.

Referring to FIG. 5, the straight tooth gears 60 and 61 replace the helical gears of FIG. 1 and provide the reaction point for the helical gears 16 and 18 camming action to advance and retard the race 14 relative to the race 15 to adjust and control the helical angle of the roller or barrel 62 whose opposite ends lie in the slots 49 of the races. It is to be noted that barrel or roller 62 has ends lying in the slots 49 obviating the pins 39 in the first embodiment. The torque pin 63 on the shaft 20 travelling in the ways 64 prevents relative rotation of the shaft 20.

In operation, the motor is switched on with the clevis 22 centered and the balls at zero helix angle whereupon the motor drives the ring gear 23, camming rings 24 and 25, and spacers 36 and 37 at the desired ring speed and since the shaft 12 is rotationally stationary, such as being secured by the part operated, not shown, the balls 11 rotate at the planet speed between the rotating cam rings and the non-rotation shaft 12 with the pins 39 communicating planet speed to the races 44 and 45, helical gears 16 and 17 helical idler gears 18 and 19, and control shaft 20.

Thus, by moving the clevis and associated gears, the races 14 and 15 are cammed by their associated gears angularly forwardly and rearwardly relative to one another and since their slots 44 and 45 move therewith the pins 39 ends therein also move forwardly and rearwardly angularly so that the balls 11 are helically angled relative to the shaft 12 and when the balls 11 planetwise rotate about the shaft at a helical angle they thrust the shaft axially in the indicated direction which shaft movement speed being a result of combined ball orbital speed and applied helix angle.

It has been found with a 1½ inch thrust shaft and 1300 lbs. of lineal thrust against the cam rings urging the balls 11 against the shaft 12, that the device produces 3000 lbs. of axial thrust with 3 ft. per second amplitude of axial movement relative to normal motor speeds with a two horsepower electric motor and shafts up to 20 ft. long have been employed with satisfactory results and it appears that much longer shafts may be used if desired.

Thus the operator by moving the clevis in either direction desired can cause the shaft to move in either direction at high speed with uni-directional motor and race rotation and also that he may reverse shaft axial movement instantaneously by opposite clevis movement or hold the thrust shaft axially stationary by centering the clevis.

Alhough but a single embodiment of the invention has been shown and described in detail, it is obvious that many changes may be made in the size, shape, detail, and arrangement of the various elements of the invention within the scope of the appended claims.

I claim:

1. A rotary motion to lineal motion mechanical converter comprising, a case having an axial bore, a thrust shaft axially slideably disposed in said case bore, means preventing rotational movement of said shaft, paired spaced opposed races freely sleeved about said shaft and rotationally mounted on said case having opposed sockets, balls disposed between said races in rolling contact with shaft pins diametrically disposed through said balls having opposite ends lying in said race sockets providing an axis about which said balls rotate, paired opposed cam rings surrounding said balls, a key connecting said ring gear and cam rings for imparting drive to said cam rings, means for rotating said ring gear to rotate said cam rings via said key to roll said balls about said shaft in planetary orbit with said ball pins rotationally driving said races and with said pins normally lying parallel to said thrust shaft locating said balls rolling axis at zero helix angle and zero axial thrust angle relative to said thrust shaft, a first helical gear fixed on each said race having the helix angle of each gear angularly opposed to the other constituting opposed camming surfaces, a second helical idler gear meshing with each said first helical gear, a control shaft fixed in said second helical gears; said control shaft being axially and rotationally movably disposed; and means for moving said control shaft and second helical idler gears thereon axially relative to said first helical gears on said races whereby the opposed helix angle of said helical gears in conjunction with axial movement of said second helical idler gears fixed on said control shaft causes one said first helical gear to angularly move in one direction and the other said first helical gear to angularly move in the opposite direction to cause said races to angularly move in opposite directions carrying said pins' ends in opposite directions to move the balls' rotation axis out of parallel to said thrust shaft and to lie at a helical angle of some degree relative thereto to effect axial thrust on said thrust shaft to move said thrust shaft axially in conjunction with ball rotation.

2. In a device as set forth in claim 1, means for moving said cam rings relative to said balls for adjustably forcing said balls into frictional engagement with said thrust shaft.

3. A mechanical rotary motion to lineal motion converter comprising, a case having an axial bore, a thrust shaft axially slideably disposed in said case bore, means preventing rotational movement of said shaft, paired spaced opposed races freely sleeved about said shaft and rotationally mounted on said case having opposed sockets, roller-barrels disposed between said races in rolling contact with said shaft having opposite ends lying in said race sockets providing an axis about which said barrels rotate, at least one cam ring surrounding said barrels in rolling drive contact therewith, a ring gear surrounding said cam ring, a key connecting said ring gear and cam ring for imparting rotational drive to said cam ring, means for rotating said ring gear to said cam ring via said key to roll said barrels about said shaft in planetary orbit with said barrel ends rotationally driving said races and with said barrels normally lying parallel to said thrust shaft locating said barrel's rolling axis at zero helix angle and zero axial thrust angle relative to said thrust shaft, a first gear fixed on each said race, a second idler gear meshing with each said first gear, a control shaft fixed in said second idler gears; said control shaft being axially and rotationally movably disposed, and means for moving said control shaft and second idler gears thereon axially relative to said first gears on said races; one said first gear and meshing idler gear being helical whereby the helix angle of said helical gears in conjunction with axial movement of said second helical idler gear fixed on said control shaft causes one said first helical gear and race to angularly move relative to said other meshing gears and race to cause one said race to angularly move relative to the other said race carrying said barrels' ends angularly to move the barrel's rotation axis out of parallel to said thrust shaft and to a helical angle of some degree relative thereto to effect axial thrust on said thrust shaft to move said thrust shaft axially in conjunction with barrel rotation.

4. In a device as set forth in claim 3, means for moving said cam ring relative to said balls for adjustably forcing said barrels into frictional engagement with said thrust shaft.

5. A rotary to lineal motion converter device comprising a case having a bore therethrough, a thrust shaft axially slidable disposed in said case bore, spaced sleeve races in said case surrounding said shaft having mating opposed sockets, pins disposed in said sockets normally lying axially parallel to said shaft, balls on said pins rolling on said shaft in a planetary orbit normally at zero helix angle thereto, paired opposed cam rings surrounding said balls urging them into frictional contact with said shaft, annular spacers abutting said cam rings, a ring gear spaced between said spacers surrounding said cam rings and keyed thereto for rotationally driving said cam rings to power said balls in planetary orbit, means on said races abutting said spacers, and means for advancing one said race, abutting means, and cam ring toward the others to force said cam rings toward one another to cam said balls toward said shaft, first gears surrounding each said race and connected thereto, an idler gear meshing with each said first gear, an axially slidable freely rotatable common control shaft fixed in said idler gears, and means for axially sliding and positioning said control shaft and idler gears relative to said first gears; at least one said idler gear and first gear having helical teeth constituting camming surfaces which angularly advances and retards one race relative to the other race to helically angulate said pins and balls disposed between said races relative to said shaft to thrust said shaft axially in conjunction with ball rotation.

6. A rotary to lineal motion converter device comprising a case having a bore therethrough, a thrust shaft axially slidable disposed in said case bore, spaced sleeve races in said case surrounding said shaft having mating opposed sockets, barrels having ends disposed in said sockets normally lying axially parallel to said shaft with said barrels rolling on said shaft in a planetary orbit normally at zero helix angle thereto, at least one cam ring surrounding said barrels urging them into frictional contact with said shaft, a ring gear surrounding said cam ring and keyed thereto for rotationally driving said cam ring to power said barrels in planetary orbit, a first gear surrounding each said race and connected thereto, an idler gear meshing with each said first gear, an axially slidable freely rotatable common control shaft fixed in said idler gears, and means for axially sliding and positioning said control shaft and idler gears relative to said first gears; at least one said idler gear and first gear having helical teeth constituting camming surfaces which angularly advances and retards one race relative to the other race to helically angulate said barrels disposed between said races relative to said shaft to thrust said shaft axially in conjunction with barrel rotation.

References Cited in the file of this patent

UNITED STATES PATENTS

| | | |
|---|---|---|
| 2,152,518 | Wolff | Mar. 28, 1939 |
| 2,382,105 | Server | Aug. 14, 1945 |
| 2,940,322 | Uhing | June 14, 1960 |